United States Patent [19]

Kamimori et al.

[11] Patent Number: 4,671,619
[45] Date of Patent: Jun. 9, 1987

[54] ELECTRO-OPTIC DEVICE

[75] Inventors: Tadatoshi Kamimori, Tokyo; Junichi Nagai; Mamoru Mizuhashi, both of Yokohama, all of Japan

[73] Assignee: Asahi Glass Company, Ltd., Tokyo, Japan

[21] Appl. No.: 753,150

[22] Filed: Jul. 9, 1985

[30] Foreign Application Priority Data

Jul. 24, 1984 [JP] Japan ................................ 59-152041
Jul. 24, 1984 [JP] Japan ................................ 59-152042

[51] Int. Cl.$^4$ ............................ G02F 1/01; G02F 1/23
[52] U.S. Cl. .................................................. 350/357
[58] Field of Search ......................................... 350/357

[56] References Cited

U.S. PATENT DOCUMENTS

| 3,708,220 | 1/1973 | Meyers et al. | 350/357 |
| 4,146,454 | 3/1979 | Haber | 204/182.7 |
| 4,297,005 | 10/1981 | Johnson, Jr. et al. | 350/357 |
| 4,309,081 | 1/1982 | Camlibel et al. | 350/357 |
| 4,519,930 | 5/1985 | Kakiuchi | 350/357 |

FOREIGN PATENT DOCUMENTS

| 10724 | 1/1983 | Japan | 350/357 |
| 115420 | 7/1983 | Japan | 350/357 |

Primary Examiner—William H. Punter
Attorney, Agent, or Firm—Oblon, Fisher, Spivak, McClelland & Maier

[57] ABSTRACT

An electro-optical device containing an electrochromic material layer and electrolytic solution interposed between mutually opposed base plates, each having an electrode on the surface thereof, wherein said electrolytic solution consists essentially of (a) an iodide source material as a redox reaction promoter selected from the group consisting of metal iodides and ammonium iodides, and (b) a lactone solvent capable of dissolving the redox reaction promoter, with the proviso that when the iodide ion source material is not also a metal cation source, a cation source material capable of generating $H^+$ or $Li^+$ is further added.

16 Claims, 10 Drawing Figures

1. FRONT SUBSTRATE
2. TRANSPARENT ELECTRODE
3. REAR SUBSTRATE
4. TRANSPARENT ELECTRODE
5. ELECTROCHROMIC MATERIAL LAYER
6. ELECTROLYTIC SOLUTION
7. SEALING MATERIAL
8. LIGHT CONTROL ELEMENT

1. FRONT SUBSTRATE
2. TRANSPARENT ELECTRODE
3. REAR SUBSTRATE
4. TRANSPARENT ELECTRODE
5. ELECTROCHROMIC MATERIAL LAYER
6. ELECTROLYTIC SOLUTION
7. SEALING MATERIAL
8. LIGHT CONTROL ELEMENT

FIGURE 4
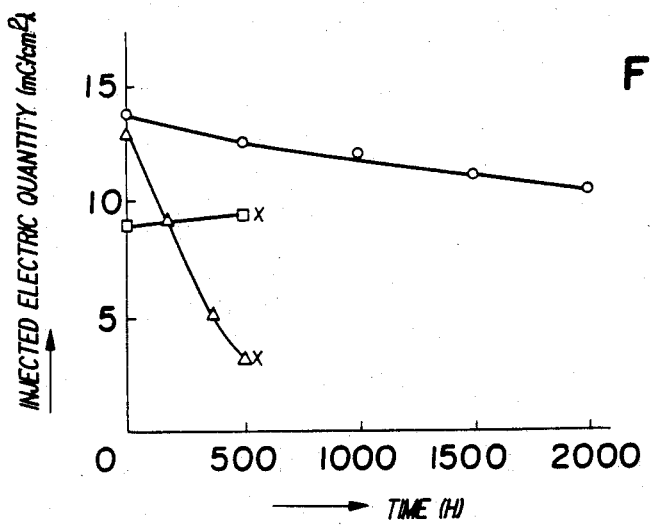
FIGURE 6
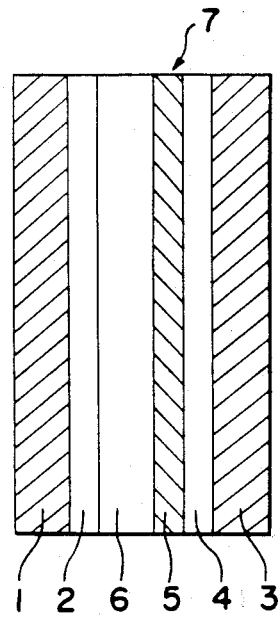
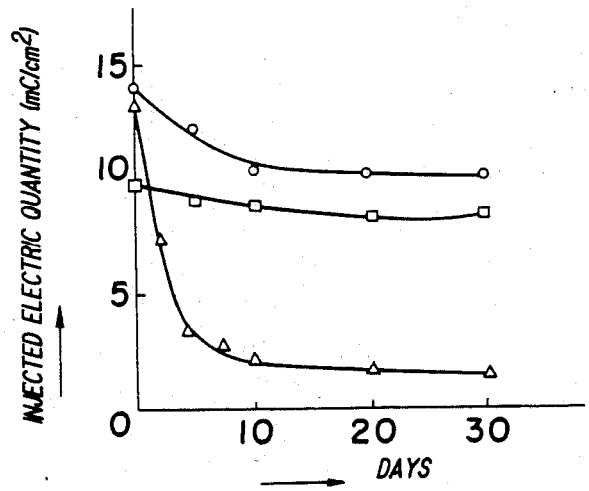
FIGURE 5

ELECTRO-OPTIC DEVICE

The present invention relates to an electro-optic device, and, more particularly, it is concerned with an electro-optic device using the so-called "electrochromic material".

In recent years, the electro-optic device using the electrochromic material has begun to be used as an anti-dazzling mirror, a light control window, various kinds of display devices, and others.

Such electro-optic device is usually constructed with a pair of base substrates, each having an electrode provided on its surface, between which are interposed an electrochromic material such as $WO_3$, $MoO_3$, etc. and an electrolytic solution containing therein an ion capable of forming color in this electrochromic material.

For the abovementioned electrolytic solution, there have been made studies on those of various compositions containing therein $H^+$ or $Li^+$ and having good ionic conductivity. Representatives of such electrolytic solution are, on the one hand, that as disclosed, for example, in an unexamined Japanese patent publication No. 138720/1980, which is made up of a $Li^+$ ion source material such as $LiClO_4$, etc. dissolved in a solvent such as propylene carbonate, and, on the other hand, that which utilizes $Li_3N$, $LiI$, or other lithium-containing ion-conductive solid state electrolyte.

In their invention which has already been applied for a patent (unexamined Japanese patent publication No. 30729/1983), the present inventors disclose that a light control device using a transparent electrode as a counter-electrode can be obtained by adding a redox reaction promotor into the electrolyte. Of the redox reaction promotors used, those iodine ion source materials which ionize the iodine ion have been found to show more excellent characteristic than the other redox reaction promotors with respect to the response characteristics and the durability. However, when LiI in solution, for example, is used as an iodine ion source material and propylene carbonate is used as the solvent, there arise such disadvantages that $CO_2$ gas would be generated at high temperatures, e.g. more than 50° C. typically, which results in a formation of $Li_2CO_3$, and, when light is irradiated, $CO_2$ gas would also be generated. There has also been a disadvantage such that, when an alcohol type solvent such as, for example, butyl alcohol (BuOH) is used, the surface of the electrochromic material such as, for example, $WO_3$ which is in contact with the electrolytic solution shifts its flat band potential in the forward direction upon irradiation of light to become readily colored, and, moreover, $H_2$ gas is generated.

Furthermore, when the electrolytic solution is a liquid of low viscosity, the electro-optic device using such electrolytic solution has the following disadvantages: that is to say, when the electro-optic device has a relatively broad area and is used in an erected state, the electrolytic solution goes downward to cause the lower part of the electro-optic device to bulge out owing to the hydrostatic pressure of the liquid; when the device is subjected to external pressure, a pair of electrode surfaces of the base plates come into contact each other to bring about short-circuit, for avoiding such troubles, there being required a spacer positioned in the area of the electrode surfaces of the base plates to maintain a definite distance between the electrode surfaces of the base plates; further, when the base plates with the electrode being provided on one surface of each of them are broken for some cause or other, the electrolytic solution and the broken pieces of substrates scatter here and there, which is dangerous; and, for preventing the electrolytic solution from leakage, it is necessary that the device be perfectly sealed in a cell form, which inevitably increases the manufacturing cost.

The present invention has been made with a view to removing the above-described disadvantages inherent in the conventional electro-optic device, and aims at providing an improved electro-optic device using an electrolytic solution which is thermally stable and does not bring about phenomena such as foaming and coloring due to light irradiation.

The other object of the present invention is to provide an electro-optic device which utilizes a gelled electrolytic solution so as to be free from any disadvantage due to the abovementioned electrolytes being in a liquid form.

The electro-optic device according to the present invention has its characteristics such that it utilizes an iodine ion source material excellent in its reaction velocity and durability as the redox reaction promotor for the electrolytic solution; a lactone type solvent having excellent solvent properties such as its dielectric constant, its boiling point, its stability, its durability, and so forth, as the solvent for dissolving the redox reaction promotor; and a cation source material, when the abovementioned iodine ion source material does not carry out its function as the cation source.

Further characteristics of the electro-optic device according to the present invention reside in that it utilizes a gelled electrolytic solution by adding to the electrolytic solution a polymer material as the gelling agent therefor.

One way of carrying out the present invention is described in detail below with reference to the accompanying drawing which illustrate a couple of specific embodiments thereof, in which:

FIGS. 2 to 5 are respectively graphical representations showing various test results on the embodimental device shown in FIG. 1;

FIG. 6 is longitudinal cross-section of another preferred embodiment according to the present invention;

Figure 1:
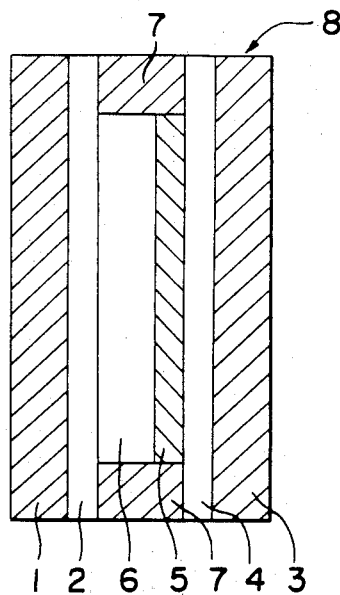
FIG. 1 is a longitudinal cross-section of one preferred embodiment according to the present invention.

and FIGS. 7 to 10 are respectively graphical representations showing various test results on the embodimental device shown in FIG. 6.

In the following, the present invention will be described in specific details.

The base plate (or substrate) having the electrode on at least one surface thereof is so constructed that an electrically conductive transparent coating film such as $SnO_2$, $In_2O_3$, ITO (indium tin oxide), and so forth is formed on at least one surface of the base plate made of a material such as glass or plastic by the known methods such as vacuum deposition, sputtering, chemical vapor deposition, and others to make the electrode. By the way, for uses such as a light control mirror, etc., in which no light is required to pass through the electro-optic device, one of a pair of the base plates needs not be transparent, and may be made of ceramic or a metal such as aluminum, etc. As the electrode, there may be used a reflective electrode of TiN, ZrN, HfN, and so on. Further, it is also possible in the light control mirror that both base plates may be made of a transparent material, and the rear surface of one of the base plates, on which the electrode is to be provided, be rendered a mirror surface.

For the electrochromic material, there may be used $WO_3$, $MoO_3$, $TiO_2$, $Ir_2O_3$, and other known substances, of which $WO_3$ type materials are particularly desirable.

For the redox reaction promotor in the electrolytic solution, there may be used an iodine ion source material. The iodine ion source material to be used may be selected from metal iodides such as LiI, NaI, etc., or ammonium type iodide such as $NH_4I$, $(C_2H_5)_4NI$, etc. When the ammonium type iodides and the like are employed, those cations such as $H^+$, $Li^+$, etc. which form color in the layer of the electrochromic material are required to be added for the injection of the ion into the electrochromic layer. Of these redox reaction promotors, LiI is particularly preferable from the standpoints of the cation having a small ionic radius, and the discharge voltage being high, hence its possible driving potential width being broad.

With such redox reaction promotors, transparent or reflective materials can be used as a counter-electrode, hence a particularly effective result can be obtained when they are used in the electro-optic devices such as the light control mirror, light control window, etc., in which the counter-electrode should not be non-transparent, unlike those found in ordinary display elements. Also, when used as a small-sized display device, the electro-optic device of the present invention has its cycle life of color forming and extinguishing of more than $10^6$ times, hence it has sufficient durability as a practical display device with an improved characteristics.

As a solvent dissolving the redox reaction promotor, there may be used $\beta$-lactone, $\gamma$-lactone, $\delta$-lactone and other lactone type materials. The electrolytic solution for use in the present invention may be prepared by an addition of the abovementioned iodine ion source material to the solvent in a concentration from 0.001 mol/liter to saturation. Of these lactone type materials, $\gamma$-butyrolactone ($\gamma$-BL) is particularly preferable in view of its having all the desirable properties such as high boiling point, stability, etc., allowing to provide stable performance at high temperatures. It has a high dielectric constant, is able to dissolve a large quantity of solute, and renders a good ionic conductivity; it has a low solidifying point, hence it can be used at a low temperature, and it has less toxicity, and so forth.

It is also possible that the electrolytic solution prepared in the abovementioned manner be gelled by an addition of a gelling agent in a concentration from 5% by weight to its saturation quantity to thereby increase viscosity of the electrolytic solution. Such gelling agent should preferably have good weather-resistant property, can be dissolved stably in a solvent, has electrochemical stability, and has adhesive property to the base plate having electrode on its surface. Examples of such gelling agent are preferably polymers, in particular, polyvinyl acetal type polymers (polyvinyl butyral being representative), urethane type polymers, acrylic type polymers, and others.

In the following, the electro-optic device according to one embodiment of the present invention will be explained in reference to the cross-sectional view shown in FIG. 1.

First of all, an ITO film was coated using vacuum deposition method to a film thickness of 1,500 Å on a rear substrate 3 made of glass and having a size of 10 cm square, thereby forming a transparent electrode 4.

Then, onto the transparent electrode 4 formed on the rear substrate 3, a $WO_3$ film was evaporatively deposited to a film thickness of 5,000 Å to thereby form an electrochromic layer 5.

On the other hand, an ITO film was evaporatively deposited on a front substrate 1 made of glass and having a size of 10 cm square to thereby form a transparent electrode 2.

Following this, the abovementioned front substrate 1 and rear substrate 3 were mutually opposed with a space interval between the ITO film and the $WO_3$ film being 200 μm to form a cell; thereafter, an electrlytic solution 6 prepared by dissolving 0.2 mol/liter of LiI into $\gamma$-butyrolactone was injected into the thus formed cell, followed by sealing the cell with sealing material 7. In this way, a light control element 8 was fabricated.

This light control element 8 had its response speed of ten seconds at 25° C. in its coloring rate of from 80% to 20% when 1.5 V was applied, and also exhibited excellent properties when subjected to the cycle tests and the heat-resistance tests as shown in FIGS. 2 to 5.

Figure 2:
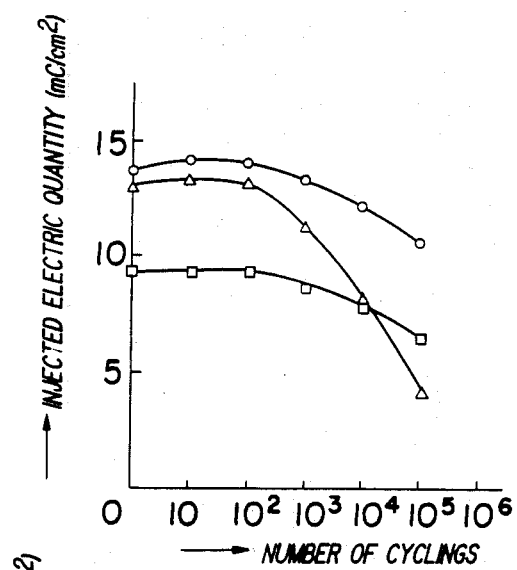

That is to say, FIG. 2 is a graphical representation showing the data obtained from the cycle test, wherein coloration and decoloration were repeated by applying an electric potential of ±1 volt across the electrodes of the light control element for one minute. In the graph, the ordinate represents the injected electric charge after application of the electric potential of ±1 volt for one minute, and the abscissa denotes the number of cycles. The curve with marks "o" shows the data of the abovementioned example; the curve with marks "Δ" represents the data of the light control element, in which use was made of an electrolytic solution obtained by dissolving 0.2 mol/liter of LiI into propylene carbonate as the solvent; and the curve with marks "□" denotes the data of the light control element, in which use was made of an electrolytic solution prepared by dissolving 0.2 mol/liter of LiI into BuOH as the solvent. The measurement was done at a room temperature, and a unit of measurement of the injected electric charge is "$mC/cm^2$".

As is apparent from this graphical representation, the light control element according to the example of this invention with LiI as the redox reaction promotor and $\gamma$-butyrolactone as the solvent exhibited a stable and high speed response characteristic in comparison with those light control elements using the other solvents, and was also durable against the cycle test of $10^5$ times.

Figure 3:
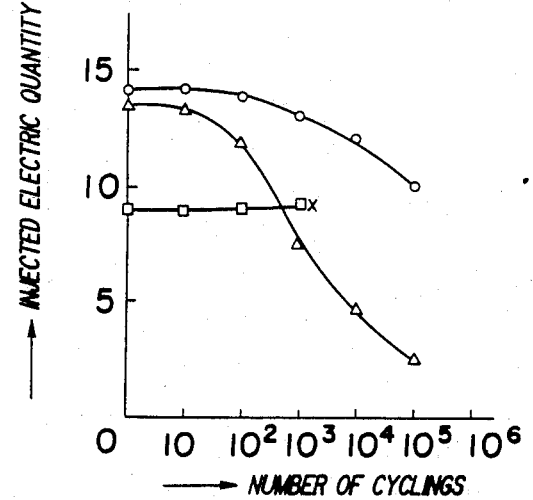

FIG. 3 is a graphical representation showing the data obtained from the test for examining durability of the light control element by subjecting it to outdoor natural environment such as ultra-violet rays, rain, and so forth. It is so-called "outdoor exposure cycle test". The specimens used, the test method, etc. are the same as in the cycle test in FIG. 2.

In this test, the light control element using BuOH as the solvent was found to produce foams and decolor after cycles of about $10^3$ times. Also, the light control element using propylene carbonate as the solvent was found to remarkably decrease its injected electric charge after the cycle test of from $10^2$ to $10^3$ times, and, after the cycle test of $10^5$ times, it resulted in foaming. In contrast to these test specimens, the light control element according to the example of the present invention, in which $\gamma$-butyrolactone was used, exhibited a slight decrease in its injected electric quantity after the cycle test of $10^5$ times and produced no foam, hence it showed sufficiently durable properties from the practical standpoint. This slight decreasing phenomenon in contrast has already been elucidated as the change in $WO_3$ potential caused primarily by the ion-exchange reaction. (Proc. SPIE 502(1984) 59).

FIG. 4 is a graphical representation showing the data obtained from the weather-resistance test of the light control elements performed in a "SUN SHINE WEATHER-O-METER" (hereinafter abbreviated as "WOM"). In the graph, the abscissa represents a testing time by WOM, and the ordinate denotes the injected electric charge after the application of $\pm 1$ volt for one minute. In this test, the light control elements using butyl alcohol and propylane carbonate as the solvent were found to produce foam and became unable to decolor after 500 hours' test. In contrast to these examples, the light control element according to the example of this invention using γ-butyrolactone was found to be durable against 2,000 hours' test and result in no foaming, hence it was sufficient for practical use.

FIG. 5 is a graphical representation showing the data obtained from the heat-resistance test, in which the abscissa denotes the number of days when the test specimens were put in an environment of 60° C., and the ordinate represents the injected electric charge after one minute application of $\pm 1$ volt. In this test, the light control element using propylene carbonate as the solvent was found to deposit white powdery deposits after ten days under the abovementioned environmental condition to become unable to be used. In contrast to this, the light control element according to the example of this invention, in which γ-butyrolactone was used as the solvent, exhibited a high speed response and good durability for 30 days, hence it proved sufficient practical durability.

In the same manner as in the embodiment shown in FIG. 1, there were formed on the rear substrate the transparent electrode and the $WO_3$ film, and the front substrate with the transparent electrode formed thereon. After these substrates were assembled to form a cell, an electrolytic solution prepared by dissolving 0.5 mol/liter of $(CH_3)_4NI$ as the iodine ion source material and 0.5 mol/liter of $LiClO_4$ as the cation source into γ-valerolactone as the solvent was injected into the cell and sealed, thereby fabricating the light control element.

This light control element exhibited excellent properties in its response speed, weather-resistant property, heat-resistant property, and others, which are almost equal to those of the present invention as shown in FIGS. 2-5.

FIG. 6 is a cross-sectional view showing another embodiment of the light control element according to the present invention. The light control element may also be fabricated in the same manner as in the embodiment shown in FIG. 1. That is to say, the ITO film was prepared by vacuum-deposition method to a film thickness of 1,500 Å on the rear substrate 3 made of glass and having a size of 10 cm square to form the transparent electrode 4; further, the $WO_3$ film was evaporatively deposited to a film thickness of 5,000 Å onto the transparent electrode 4 on the rear substrate 3, thereby forming the electrochromic material layer 5.

On the other hand, the ITO film was evaporatively deposited to a film thickness of 1,500 Å on the front substrate 1 made of glass and having a size of 10 cm square to thereby form the transparent electrode 2.

As the electroyte 6, use was made of a gelled material which was prepared by dissolving 0.5 mol/liter of LiI into γ-butyrolactone and then mixing with it polyvinyl butyral (PVB) to a quantity of 50% by weight. A layer of the gelled electrolyte 6 was inserted between the electrochromic material layer 5 and the transparent electrode 2 with a thickness of 50 μm, and then press-sealed.

The thus fablicated light control element 7 had its response speed of 10 seconds at 25° C. in its coloring rate of from 80% to 20% on an application of 1.5 V, and exhibited excellent characteristics in the cycle tests and the heat resistance test as shown in FIGS. 7 to 10.

Figure 7:
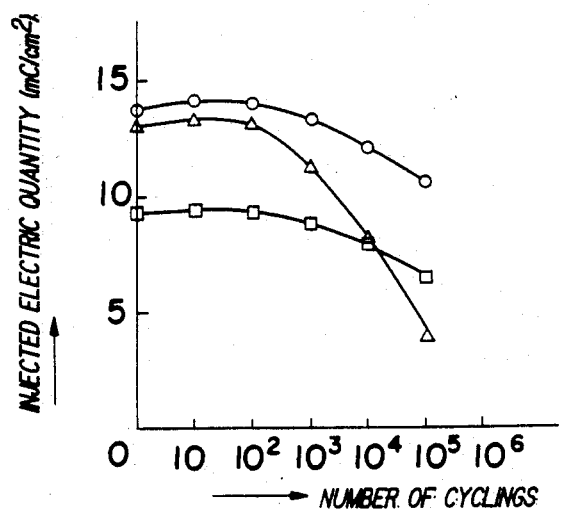

This is to say, FIG. 7 is a graphical representation showing the data obtained from the cycle test, in which coloring and decoloring were repeated by applying an electric potential of $\pm 1$ volt across the electrodes of the light control element for one minute. In the graph, the ordinate shows the injected electric charge when an electric potential of $\pm 1$ volt was applied for one minute across the electrodes, and the abscissa indicates the number of cycles for the coloring and decoloring. The curve with marks "o" was plotted with the data of the abovementioned example; the curve with marks "Δ" was plotted with the data of the light control element using the electrolytic solution prepared by dissolving 0.5 mol/liter of LiI into propylene carbonate as the solvent; and the curve with marks "□" was plotted with the data of the light control element using the electrolytic solution prepared by dissolving 0.5 mol/liter of LiI into BuOH as the solvent. The measurement was done at a room temperature, and the unit of measurement of the injected electric quantity was "$mC/cm^2$".

As is apparent from this graphical representation, the light control element according to the example of this invention using LiI as a redox reaction promotor, γ-butyrolactone as a solvent and PVB as a gelling agent exhibited a stable and high speed response characteristic in comparison with those light control elements using other solvents, and was also durable against the cycle test of $10^5$ times.

Figure 8:
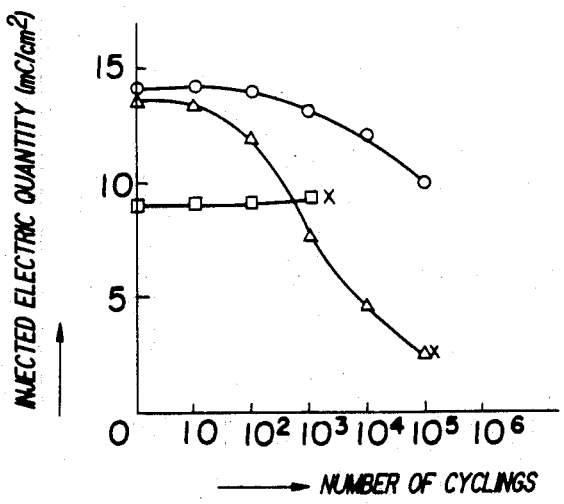

FIG. 8 is a graphical representation showing the results of the afore-mentioned outdoor exposure cycle test. The specimens used, the test method, and so on are the same as those in the cycle test of FIG. 7.

In this test, the light control element using butyl alcohol as the solvent was found to produce foam and become unable to decolor after the cycle test of $10^3$ times. Also, the light control element using propylene carbonate as the solvent was found to remarkably decrease its injected electric charge after the cycle test of $10^2$ to $10^3$ times, and, after the cycle test of $10^5$ times, it resulted in foaming. In contrast to these examples, the light control element according to the present invention, in which γ-butyrolactone was used as the solvent showed a very slight decrease in its injected electric charge after the cycle test of $10^5$ times and produced no foam, hence it had sufficiently durable characteristics for the practical purpose.

Figure 9:
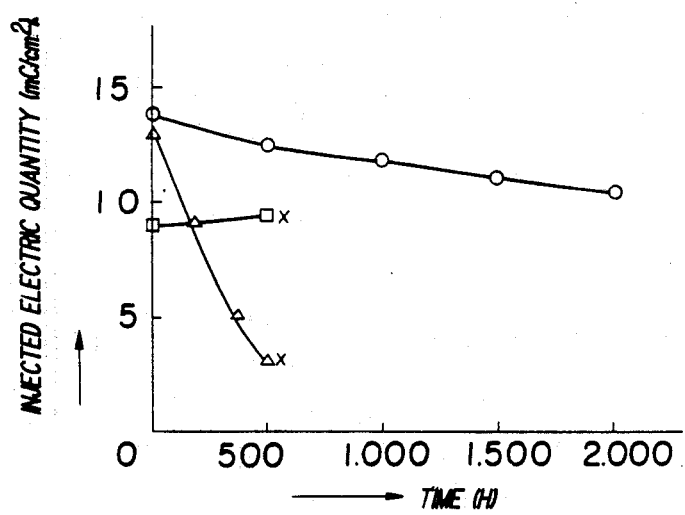

FIG. 9 is a graphical representation showing the data obtained from the weather-resistance test by means of WOM, in which the abscissa denotes the test time in the WOM, and the ordinate represents the injected electric charge at the time of voltage application for one minute with a potential of $\pm 1$ volt. In this test, the light control elements using butyl alcohol and propylene carbonate as the solvent were found to produce foam and become unable to decolor after the 500 hours' test. In contrast to this, the light control element according the example of this invention using γ-butyrolactone was found to be durable against 2,000 hours' test, and produce no foam, and so exhibited sufficient properties for the practical purpose.

Figure 10:
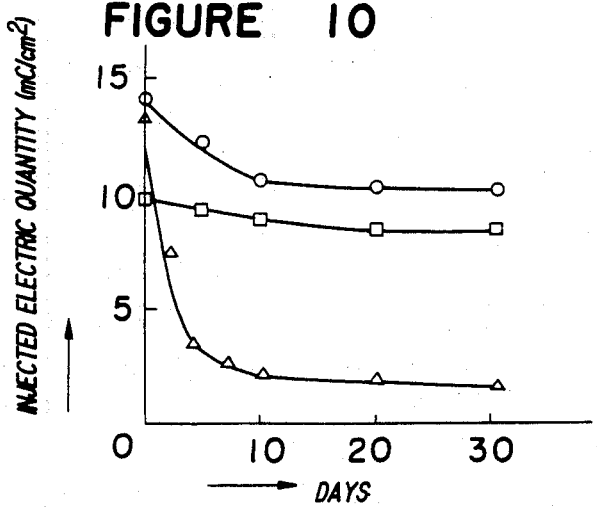

FIG. 10 is a graphical representation showing the data obtained from the heat-resistance test, in which the abscissa represents the number of days, during which the specimens were put in an environment of 60° C., and the ordinate denotes the injected electric quantity at the time of voltage application for one minute with a potential of ±1 volt.

In this test, the light control element using propylene carbonate as a solvent was found to deposit white powdery deposits after subjecting the specimen for ten days, and became unusable. In contrast to this, the light control element according to the example of this invention using γ-butyrolactone as a solvent exhibited high speed response characteristics and durability at 60° C. for 30 days, thus indicating its sufficient practical utility.

Needless to say, during the above-described cycle tests, the light control element according to the example of the present invention did not bring about any deformation in the glass substrate such as bulging-out, etc. Even when the glass substrate was broken intentionally with stone, there was observed no scattering of not only the gelled electrolyte per se, but also the glass substrate, in contrast to the glass substrate and the electrolytic solution of those light control elements using the other type of electrolyte in solution having been scattered. The reason for this superiority of the light control element according to the present invention is that the gelled electrolyte of this example adhered to the glass substrates to prevent the element to break into small pieces.

Next, a further light control element was fabricated using the gelled electrolyte of the same composition as in the example of FIG. 6 with an exception that a theomoplastic urethane was used as a gelling agent in place of polyvinyl butyral.

With this light control element, there could also be obtained favorable data in respect of its characteristics, which are substantially equal to those of the light control element in FIGS. 7–10.

As has been described in the foregoing, the electro-optic device according to the present invention utilizes the electrolytic solution prepared by dissolving the iodine ion source material as a redox reaction promotor into the lactone type solvent, as a consequence of which the device has a high response speed, does not bring about foaming, lowering in its response speed, and other mal-effects even under unfavorable environmental conditions such as irradiation of light, ultra-violet rays, etc., or high temperature, or others, is durable against the cycle test for $10^6$ times, and possesses sufficient weather-resistant property and durability.

Furthermore, when the electrolytic solution is gelled with a polymer, the electro-optic device, even if it has a large area, may not need spacers, does not bring about troubles and disorders such as deformation of the base plate having the electrode on its surface, short-circuiting, etc., does not cause scattering of the electrolyte and the base plate having electrode on its surface when the base plate happens to be broken, and does not require the electro-optic device to be formed inside a cell for prevention of the electrolytic solution from leaking on breakage, hence the manufancturing cost of the electro-optic device according to the present invention can be kept low.

We claim:

1. An electro-optical device comprising an electrochemical material layer and an electrolytic solution interposed between mutually opposed base plates, each having an electrode on the surface thereof, wherein said electrolytic solution consists essentially of:
   (a) an iodide source material as a redox reaction promoter selected from the group consisting of metal iodides an ammonium iodides, and
   (b) a lactone solvent capable of dissolving the redox reaction promoter, with the proviso that when the iodide ion source material is not also a metal cation source, a cation source material which is capable of generating H+ or Li+ ions is further added.

2. The electro-optical device according to claim 1, wherein said metal iodide is selected from the group consisting of LiI and NaI; and said ammonium iodide is selected from the group consisting of $NH_4I$, $(CH_3)_4NI$ and $(C_2H_5)_4NI$.

3. The electro-optical device according to claim 2, wherein said metal iodide is lithium iodide.

4. The electro-optical device according to claim 1, wherein said lactone solvent is a β-, γ- or δ-lactone solvent.

5. The electro-optical device according to claim 4, wherein said lactone solvent is γ-butyrolactone.

6. The electro-optical device according to claim 1, wherein said electrochromic material layer is a material layer selected from the group consisting of $WO_3$, $MoO_3$, $TiO_2$ and $Ir_2O_3$ layers.

7. An electro-optical device comprising an electrochemical material layer and a gelled electrolytic solution interposed between neutrally opposed base plates, each having an electrode on the surface thereof, wherein said gelled electrolytic solution consists essentially of:
   (a) an iodide ion source material as a redox reaction promoter selected from the group consisting of metal iodides and ammonium iodides, and
   (b) a lactone solvent capable of dissolving the redox reaction promoter, with the proviso that when the iodide source material is not also a metal cation source, a cation source material capable of generating H+ or Li+ ions is further added, and wherein a polymer is added to the electrolytic solution to increase the viscosity thereof, to form a gel of said electrolytic solution.

8. The electro-optical device according to claim 7, in which said polymer is a polyvinyl acetal polymer.

9. The electro-optical device according to claim 8, in which said polymer is polyvinyl butyral.

10. The electro-optical device according to claim 7, in which said polymer is urethane.

11. The electro-optical device according to claim 7, in which said polymer is an acrylic polymer.

12. The electro-optical device according to claim 7, wherein said metal iodide is selected from the group consisting of LiI and NaI, and said ammonium iodide is selected from the group consisting of $NH_4I$, $(CH_3)_4NI$ and $(C_2H_5)_4NI$.

13. The electro-optical device according to claim 7, wherein when an ammonium iodide is used as the redox reaction promoter, $LiClO_4$ is added as a cation source material.

14. The electro-optical device according to claim 7, wherein said lactone solvent is a β-, γ- or δ-lactone solvent.

15. The electro-optical device according to claim 14, wherein said lactone solvent is γ-butyrolactone.

16. The electro-optical device according to claim 7, wherein said electrochromic material layer is a material layer selected from the group consisting of $WO_3$, $MoO_3$, $TiO_2$ and $Ir_2O_3$ layers.

* * * * *